United States Patent

[11] 3,588,697

[72] Inventor Harold D. Cook
 Wheaton, Ill.
[21] Appl No 756,775
[22] Filed Sept. 3, 1968
[45] Patented June 28, 1971
[73] Assignee Teletype Corporation
 Skokie, Ill.

[54] TESTER FOR IN-CIRCUIT SATURATED TRANSISTORS AND METHODS OF TESTING IN-CIRCUIT SATURATED TRANSISTORS
3 Claims, 2 Drawing Figs.

[52] U.S. Cl. ............................................ 324/158T,
 307/296
[51] Int. Cl. ........................................... G01r 31/22,
 H03k 1/00
[50] Field of Search ................................ 324/158,
 158 (T), 158 (D); 307/296, 237

[56] References Cited
UNITED STATES PATENTS
2,850,699 9/1958 Davidson .................. 324/158

OTHER REFERENCES

Bentley et al., " Simplified Transistor Test Equipment" ; Tele-Tech and Electronic Industries; September 1955; pages 56, 57, 118, 120; copy in 324/158T
ELECTRONICS WORLD. Vol. 73, 06, June, 1965, pp. 65-68

Primary Examiner—Rudolph V. Rolinec
Assistant Examiner—Ernest F. Karlsen
Attorneys—J L. Landis and R. P. Miller ABSTRACT: In-circuit testing for collector-emitter short circuits of transistors is achieved by providing a variable impedance probe connected between the collector node of the transistor and a source of operating potential. The impedance of the transistor probe is reduced to a point where the gain of the transistor no longer is sufficient to keep the output in saturation. If the node voltage then rises, the transistor must be functioning properly; if, however, the node voltage does not rise, a direct short exists to ground in either the transistor, in one of the circuits being supplied from the output of the transistor, or in the wiring between the transistor and the circuits.

PATENTED JUN28 1971 3,588,697

INVENTOR
HAROLD D. COOK
BY LaValle Stoh
ATTORNEY

TESTER FOR IN-CIRCUIT SATURATED TRANSISTORS AND METHODS OF TESTING IN-CIRCUIT SATURATED TRANSISTORS

BACKGROUND OF THE INVENTION

When an electronic circuit fails to function properly, it is desirable to ascertain the location and nature of the failure so that the circuit may be repaired. When discrete components are used in a wired circuit, it is a relatively simple matter to remove the components from the circuit for individual testing and to replace defective components without risking destruction of other fault-free elements in the circuit. With printed circuits having small discrete components mounted thereon, the problem of testing the components for failure is substantially increased. However, most circuit cards carry only a single circuit or a relatively small number of circuits; so that a defective circuit card may be removed from the system and individually tested or discarded and replaced with a properly operating card.

With integrated circuit packages, however, trouble shooting of logic systems is considerably more difficult than troubleshooting of discrete component logic circuits. The large number of integrated circuits are usually "fixed wired" (that is soldered) in position on a circuit card, and these circuits are not easily removed. The heat conducted to the circuit card or to an integrated circuit package by way of the leads during an unsoldering and resoldering operation frequently destroys the card or the package even though it may have been fault-free before it was unsoldered from the circuit for testing.

Thus, the only desirable manner of testing integrated circuit logic elements is to test these elements in their normal circuit environment. To test a circuit in this manner, however, presents a number of problems. Currents cannot readily be measured without breaking into the lead in question nor can the effect of one circuit be separated from another circuit connected to the same node or common connection point. For example, if a node consisting of the output of one gate and the inputs of three other gates indicates that it is shorted to ground, it is practically impossible to determine which circuit is causing the short circuit without removing the node connections one at a time. With integrated circuit packages, this is an expensive, time consuming and often destructive operation. Thus, it is desirable to provide some means for performing an in-circuit test for a short circuit at a node in an integrated circuit system.

SUMMARY OF THE INVENTION

When the voltage at a node driven by a transistor fails to rise, an in-circuit test for short circuit at the node is accomplished by pulling the transistor out of saturation without disturbing the driving signals applied to the transistor if the transistor is being driven to saturation. If the node voltage then rises, the output transistor must be functioning properly and there is no direct short to ground in the output transistor or in the inputs of the circuits being driven by the output of the transistor. If the node voltage does not rise, there must be a direct short to ground in either the driving transistor or one of the inputs being driven by the transistor or in the wiring between them.

DETAILED DESCRIPTION

Figure 1:
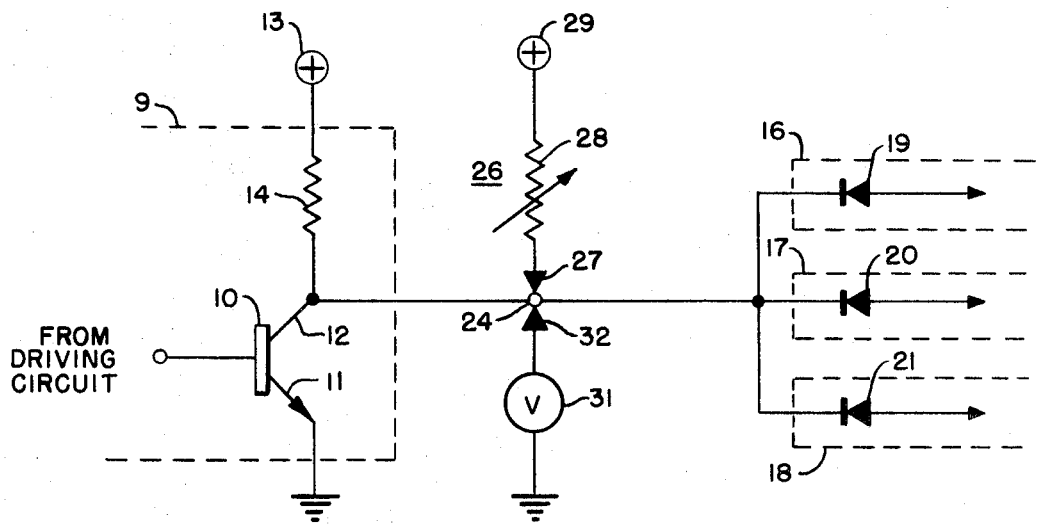
FIG. 1 is a circuit diagram of a circuit being tested in accordance with a preferred embodiment of this invention.

Referring now to FIG. 1, there is shown a typical circuit with which the in-circuit transistor short circuit tester may be used. The transistor to be tested is an NPN transistor 10 forming the output transistor of an integrated circuit output gate package 9. The details of the circuits in the package 9 for driving the transistor 10 are not shown, but the signals applied to the base of the transistor 10 are sufficient to drive the transistor between cutoff and saturation in a conventional manner. The emitter 11 of the transistor 10 is connected directly to ground and the collector 12 of the transistor is connected to a source of positive potential 13 outside the package 9 through a collector resistor 14 located inside the package 9. Thus when the transistor 10 is driven to saturation or is fully conductive, the potential appearing on the collector 12 thereof is substantially ground potential.

When the transistor is cutoff, however, the potential on the collector 12 should rise to near the positive potential of the source 13. If a short circuit exists in the transistor 10, in one of the circuits driven by the transistor 10, or in the interwiring between the transistor and the circuits, the output potential at the collector 12 of the transistor 10 will not rise to a positive potential when the driving signal supplied to the base of the transistor 10 should drive the transistor to cut off. This type of a failure is evidenced by a failure of a change in the input detected by typical gates such as integrated circuit gate packages 16, 17 and 18, each having included therein an input diode 19, 20 and 21, respectively, the cathodes of which all are connected together to the node 24 driven by the collector output of the transistor 10. This failure of the input to the gates 16, 17 and 18, to change in the operation of the system with which these gates are associated could be due either to a failure in the driving circuit supplying driving signals to the base of the transistor 10, or could occur due to a short circuit in the transistor 10 itself, a short circuit at the inputs of the diodes 19, 20 and 21, or a short circuit in the interwiring.

It is desirable to be able to test whether or not a short circuit exists at the node 24 without removing the package 9, containing the transistor 10, or the gate packages 16, 17 and 18 from the circuit of which they are a part. It also is desirable to perform such a short circuit test without changing the normal input signals being supplied to the base of the transistor 10, since to do so could disrupt the operation of other portions of the system of which this particular driving transistor and gate input circuit are but a small part.

In accordance with a preferred embodiment of the invention, this is accomplished with a variable impedance probe 26, including a probe point 27 and a variable resistor 28 connected to a source of positive potential 29, which can be the same source of potential as the source of potential 13. The probe point 27 is physically connected to the node 24 and this can be done merely by touching the node or by clamping the probe 27 to the wire which is exposed at the node 24. The resistance 28 then is reduced to a point where the gain of the transistor 10 is no longer sufficient to keep the output of the transistor 10 in saturation if the transistor is being driven to saturation at that time by a signal present on the base thereof. The voltage at the node 24 may be monitored by a voltmeter 31 connected between ground and a second probe point 32 which is connected to the node 24. If the node voltage at the node 24 rises at this time, the transistor 10 must be functioning properly and there is no direct short circuit to ground in the transistor 10, in the inputs to the gates 16, 17, 18, or in the wiring between the transistor 10 and these gates. As a result, the internal operation of the driving circuits for the transistor 10 must be at fault and this should be checked next.

If, when the resistance 28 of the probe is reduced to a point where the transistor 10 should be pulled out of saturation, the node voltage detected by the voltmeter 31 at the node 24 does not rise, there must be a direct short circuit to ground in the output transistor 10 or in one or more of the inputs of the gates 16, 17 and 18, or in the wiring between the transistor 10 and these gates. It then is necessary to check the wiring for obvious short circuits, such as those caused by solder splashed on the circuit card. Then it is necessary to perform other checks to ascertain the exact nature and location of the short. It should be emphasized, however, that it is possible to determine positively whether or not a short circuit at the node 24 exists without in any way changing any of the other operations of the system with which the circuit under test is associated.

Figure 2:
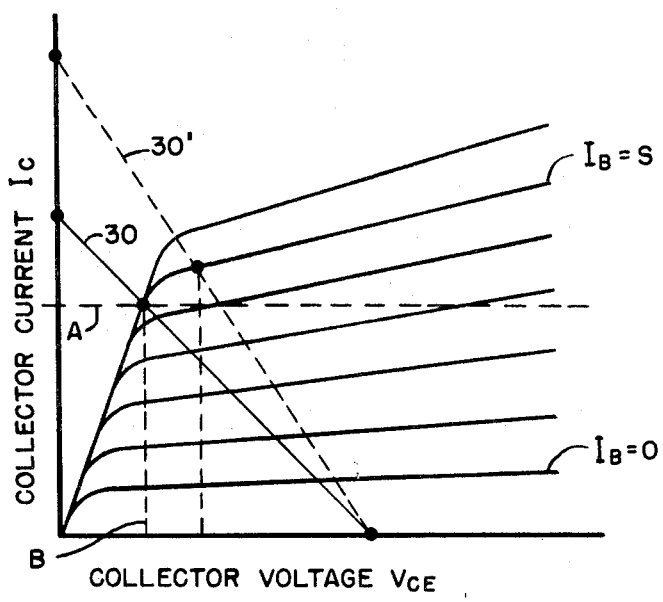
FIG. 2 shows characteristic curves of a transistor being tested in accordance with this invention.

Referring now to FIG. 2, there are shown the characteristic curves for a typical transistor being tested in accordance with this invention. The impedance of the collector resistor 14 results in a typical load line 30 indicated in FIG. 2 plotted against collector voltage $V_{ce}$ and collector current $I_c$. A number of typical curves for base current $I_b$ are also shown in FIG. 2 with the curve labeled $I_b=S$ being indicated as the base current which drives the transistor 10 into saturation. Thus, the collector current A and collector voltage B shown in FIG. 2 exist when the transistor 10 is driven into saturation for any typical value of resistance of the resistor 14.

In order to perform an in-circuit test for a short circuit, it is necessary to pull the transistor 10 out of saturation even though this base current $I_b=S$ is being applied to the base of the transistor 10. This is accomplished by reducing the effective impedance between the collector 12 and the source of collector voltage 13 by inserting the probe point 27 at the node 24 and reducing the impedance between the probe point 27 and the source of voltage 29. In effect, this causes a new load line to be established for the transistor 10; and this new load line is indicated in FIG. 2 as load line 30'. From an examination of FIG. 2, it can be seen that the load line angle of line 30' is increased sufficiently to cause the transistor 10 to be pulled out of saturation at the value of base current $I_b=S$. Since the transistor 10 no longer is in saturation, the potential on the collector thereof and the potential at the node 24 should rise if no short circuit exists at node 24.

It should be noted that the load line 30' may cross $I_b=S$ in an area which is beyond the maximum permissible power dissipation curve for the transistor 10. For normal amplifier operation of a transistor, this is highly undesirable since it could result in destruction of the transistor. As a consequence, in most cases, the signals applied to the probe point 27 must be applied on a pulsed basis; so that the average power dissipated in the transistor 10 does not exceed its rating. This pulsing can be accomplished by any suitable switching device.

The above method of pulling a transistor out of saturation can be used any time it is desirable to provide a positive potential condition for an NPN transistor output when the transistor normally is being driven into saturation. To provide ground at the output of the transistor is relatively easy, since the output may be tied to ground directly; and since the source impedance is a resistor tied to a source of positive potential, no damage to the transistor can result.

Although the invention has been described in conjunction with a transistor used in an output gate circuit driving a plurality of input gate inputs, it also could be utilized for ascertaining the presence of short circuits in transistors used in all types of possible circuits including flip-flops, amplifiers and the like. This test device is capable of driving the voltage at a node to a positive potential regardless of the voltage level the drive circuit is delivering to the input and may be used with discrete component circuits as well as with integrated circuit systems. It also should be noted that although the invention has been described in conjunction with testing an NPN transistor, the same technique could be utilized in testing a PNP transistor, the only difference being a reversal of the voltages and diode polarities shown. In all other respects, the test is identical for transistors of either type.

Although a particular embodiment of the invention is shown in the drawing and is described in the foregoing specification, it should be noted that other modifications of the invention, varied to fit particular operating conditions, will be apparent to those skilled in the art; and the invention is not to be considered limited to the embodiment chosen for purposes of disclosure, but it covers all changes and modifications which do not constitute departures from the true scope thereof.

I claim:

1. A method of in-circuit testing a saturated transistor, having its collector connected to a source of operating potential through a collector resistor, for short circuits, including the steps of:

connecting an impedance in parallel with the collector resistor to reduce the effective impedance between the collector of the transistor and its source of operating potential by an amount sufficient to pull the transistor out of saturation; and detecting the change in potential, if any, at the collector.

2. A method according to claim 1 wherein connecting the additional impedance in parallel with the circuit collector resistance is accomplished by temporarily connecting a variable impedance between a separate source of operating potential and the collector of the transistor and wherein the variable impedance is reduced to a point sufficient to pull the transistor out of saturation.

3. A method performing an in-circuit short circuit test of a transistor, having its collector connected to a source of operating potential through a collector resistor and which is being driven to saturation, without changing the driving potential applied to the transistor, comprising the steps of:

connecting an additional impedance in parallel with the collector resistor of the transistor to reduce the effective collector impedance to a point where the gain of the transistor no longer should be sufficient to keep the output of the transistor in saturation; and detecting the change, if any, of the collector voltage of the transistor, whereby a change in voltage indicates that no short circuit exists in the transistor and whereby no change in collector voltage indicates that the transistor or the circuitry to which it is connected is short-circuited.